(12) United States Patent
McDaniel et al.

(10) Patent No.: US 11,369,947 B2
(45) Date of Patent: Jun. 28, 2022

(54) METHODS FOR MAKING SUPPORTED CHROMIUM CATALYSTS WITH INCREASED POLYMERIZATION ACTIVITY

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 236 days.

(21) Appl. No.: 16/575,473

(22) Filed: Sep. 19, 2019

(65) Prior Publication Data
US 2020/0094225 A1    Mar. 26, 2020

Related U.S. Application Data

(60) Provisional application No. 62/735,218, filed on Sep. 24, 2018.

(51) Int. Cl.
*B01J 23/26* (2006.01)
*B01J 21/12* (2006.01)
(Continued)

(52) U.S. Cl.
CPC ............ *B01J 23/26* (2013.01); *B01J 21/12* (2013.01); *B01J 27/047* (2013.01); *B01J 27/188* (2013.01);
(Continued)

(58) Field of Classification Search
CPC ........ B01J 21/12; B01J 23/26; B01J 35/1019; B01J 35/1042; B01J 35/1047; B01J 27/06; B01J 27/12; C08F 2/00
See application file for complete search history.

(56) References Cited

U.S. PATENT DOCUMENTS 3,242,099 A    3/1966    Manyik et al.
3,248,179 A    4/1966    Norwood
(Continued)

FOREIGN PATENT DOCUMENTS

EP    0075421 A  *  9/1982    ............ C08F 10/00

OTHER PUBLICATIONS

International Search Report and Written Opinion issued in corresponding application No. PCT/US2019/051809 dated Jan. 29, 2020, 10 pgs.
(Continued)

*Primary Examiner* — Jun Li
(74) *Attorney, Agent, or Firm* — Merchant & Gould P.C.

(57) ABSTRACT

Methods for making a supported chromium catalyst are disclosed, and can comprise contacting a silica-coated alumina containing at least 30 wt. % silica with a chromium-containing compound in a liquid, drying, and calcining in an oxidizing atmosphere at a peak temperature of at least 650° C. to form the supported chromium catalyst. The supported chromium catalyst can contain from 0.01 to 20 wt. % chromium, and typically can have a pore volume from 0.5 to 2 mL/g and a BET surface area from 275 to 550 m²/g. The supported chromium catalyst subsequently can be used to polymerize olefins to produce, for example, ethylene-based homopolymers and copolymers having high molecular weights and broad molecular weight distributions.

22 Claims, 1 Drawing Sheet

(51) Int. Cl.

| | | |
|---|---|---|
| *B01J 37/02* | (2006.01) | |
| *B01J 37/12* | (2006.01) | |
| *B01J 37/00* | (2006.01) | |
| *B01J 37/08* | (2006.01) | |
| *C08F 2/00* | (2006.01) | |
| *B01J 35/02* | (2006.01) | |
| *B01J 35/10* | (2006.01) | |
| *B01J 27/047* | (2006.01) | |
| *B01J 27/188* | (2006.01) | |

(52) U.S. Cl.
CPC ......... *B01J 35/023* (2013.01); *B01J 35/1019* (2013.01); *B01J 35/1042* (2013.01); *B01J 35/1047* (2013.01); *B01J 37/0045* (2013.01); *B01J 37/0209* (2013.01); *B01J 37/082* (2013.01); *B01J 37/12* (2013.01); *C08F 2/00* (2013.01)

(56) References Cited

U.S. PATENT DOCUMENTS

| | | |
|---|---|---|
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,352,749 A | 10/1994 | DeChellis et al. |
| 5,401,820 A | 3/1995 | McDaniel et al. |
| 5,436,304 A | 7/1995 | Griffin et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,174,981 B1 | 1/2001 | Bergmeister et al. |
| 6,239,235 B1 | 5/2001 | Hottovy et al. |
| 6,262,191 B1 | 7/2001 | Hottovy et al. |
| 6,833,415 B2 | 12/2004 | Kendrick et al. |
| 7,214,642 B2 | 5/2007 | McDaniel et al. |
| 7,294,599 B2 | 11/2007 | Jensen et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,884,163 B2 | 2/2011 | McDaniel et al. |
| 8,114,946 B2 | 2/2012 | Yang et al. |
| 8,309,485 B2 | 11/2012 | Yang et al. |
| 8,623,973 B1 | 1/2014 | McDaniel et al. |
| 8,815,357 B1 | 8/2014 | Inn et al. |
| 8,822,608 B1 | 9/2014 | Bhandarkar et al. |
| 8,916,494 B2 | 12/2014 | McDaniel et al. |
| 9,023,959 B2 | 5/2015 | McDaniel et al. |
| 9,365,667 B2 | 6/2016 | McDaniel et al. |
| 9,505,856 B1* | 11/2016 | Schwerdtfeger ......... B01J 37/08 |
| 9,670,296 B2 | 6/2017 | McDaniel et al. |
| 9,758,599 B2 | 9/2017 | Ding et al. |
| 10,246,528 B2 | 4/2019 | McDaniel et al. |
| 2004/0059070 A1 | 3/2004 | Whitte et al. |
| 2006/0155082 A1* | 6/2006 | McDaniel et al. ...... C08F 10/00 |
| 2010/0076167 A1* | 3/2010 | Mcdaniel ............. C08F 210/08 |
| | | 526/130 |
| 2012/0071614 A1 | 3/2012 | Schmidt et al. |
| 2015/0191554 A1 | 7/2015 | McDaniel et al. |
| 2017/0096512 A1 | 4/2017 | Hlavinka et al. |

OTHER PUBLICATIONS

IUPAC Compendium of Chemical Technology, 2nd Edition, 1997.
Modern Plastics Encyclopedia, Mid-Nov. 1995 Issue, vol. 72, No. 12, 3 pages.
Film Extrusion Manual—Process, Materials, Properties, TAPPI Press, 1992, 16 pages.
Hieber et al., entitled "Some correlations involving the shear viscosity of polystyrene melts," Rheologica Acta, 1989, vol. 28, pp. 321-332.
Hieber et al., entitled "Shear-Rate-Dependence Modeling of Polymer Melt Viscosity," Polymer Engineering and Science, 1992, 32(14), pp. 931-938.
Bird et al., entitled "Dynamics of Polymeric Liquids," vol. 1, Fluid Mechanics, 2nd Edition, John Wiley & Sons, 1987, 3 pages.
Stephen Braunauer, et al., "Adsorption of Gases in Multimolecular Layers," Journal Am. Chem. Soc., vol. 60, Feb. 1938, pp. 309-319.
George Halsey, "Physical Adsorption on Non-Uniform Surfaces," Journal Chem. Phys., vol. 16, Mar. 9, 1948, pp. 931-937.

* cited by examiner

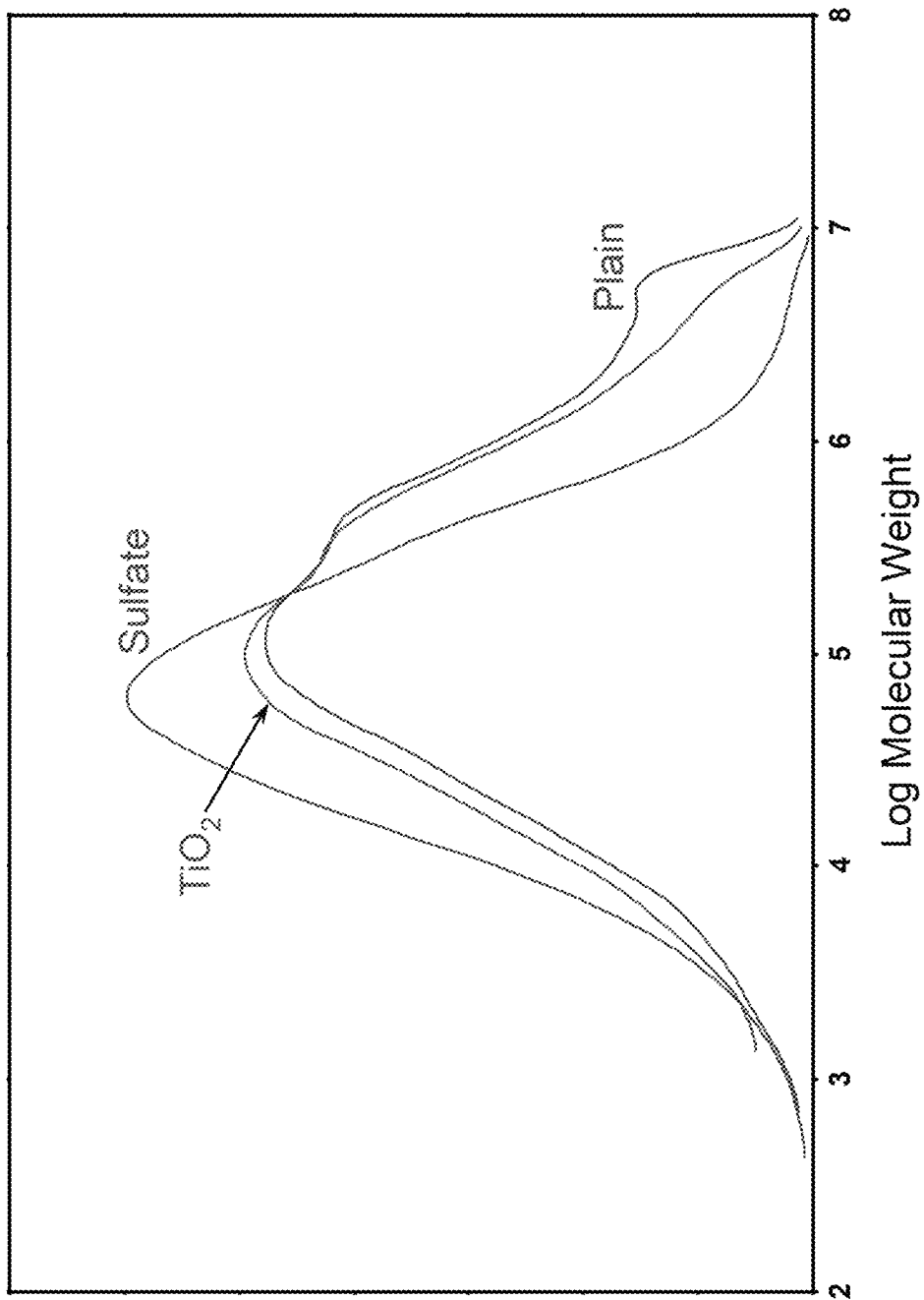

US 11,369,947 B2

METHODS FOR MAKING SUPPORTED CHROMIUM CATALYSTS WITH INCREASED POLYMERIZATION ACTIVITY

REFERENCE TO RELATED APPLICATION

This application claims the benefit of U.S. Provisional Patent Application No. 62/735,218, filed on Sep. 24, 2018, the disclosure of which is incorporated herein by reference in its entirety.

FIELD OF THE INVENTION

The present disclosure generally relates to chromium catalysts, methods for preparing the chromium catalysts, methods for using the chromium catalysts to polymerize olefins, the polymer resins produced using such chromium catalysts, and articles produced using these polymer resins. More particularly, the present disclosure relates to methods of making a supported chromium catalyst containing a silica-coated alumina solid oxide support, and the subsequent use of the supported chromium catalyst in olefin polymerization processes.

BACKGROUND OF THE INVENTION

Chromium catalysts are among the most common catalysts used in olefin polymerizations. Supported chromium catalysts often are prepared by impregnating chromium onto a solid support, e.g., a solid oxide, followed by a calcining step. Generally, calcining is conducted in an oxidizing atmosphere, such that the chromium species within the supported chromium catalyst can be converted to hexavalent chromium.

Hexavalent chromium/silica-coated alumina catalysts containing less than 20 wt. % silica were evaluated in U.S. Pat. No. 5,401,820. However, these chromium/silica-coated alumina catalysts had poor catalyst activity and produced polymer of excessive molecular weight, making them inferior to traditional chromium/silica catalysts. A hexavalent chromium/silica-coated alumina catalyst also was evaluated in U.S. Patent Publication No. 2015/0191554 after calcination in dry air at 600° C. This chromium/silica-coated alumina catalyst also had poor catalyst activity and produced high molecular weight.

In view of these deficiencies, it would be beneficial to prepare chromium/silica-coated alumina catalysts with high catalytic activity for use in olefin polymerization processes. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for preparing supported chromium catalysts are disclosed and described herein. One such process for preparing a supported chromium catalyst can comprise (i) contacting a support comprising a silica-coated alumina containing at least about 30 wt. % silica with a chromium-containing compound in a liquid, and drying, and (ii) calcining at a peak temperature of at least about 650° C., often in an oxidizing atmosphere, to form the supported chromium catalyst. Another process for preparing a supported chromium catalyst consistent with this invention can comprise contacting a support comprising a silica-coated alumina with a chromium-containing compound while calcining at a peak temperature of at least about 650° C., often in an oxidizing atmosphere, to form the supported chromium catalyst. The silica-coated alumina contains at least about 30 wt. % silica.

Also encompassed herein are chromium/silica-coated alumina catalysts, and such catalysts can comprise from about 0.01 to about 20 wt. % chromium (based on the weight of the catalyst), and a silica-coated alumina containing at least about 30 wt. % silica (based on the weight of the silica-coated alumina). These catalysts can be characterized by a pore volume from about 0.5 to about 2 mL/g, and a BET surface area from about 275 to about 550 $m^2/g$.

The supported chromium catalysts disclosed herein and produced by the disclosed processes have unexpectedly high catalyst activity, and can be utilized in olefin polymerization processes. A representative polymerization process can comprise contacting the supported chromium catalyst (e.g., a chromium/silica-coated alumina catalyst) with an olefin monomer and an optional olefin comonomer in a polymerization reactor system under polymerization conditions to produce an olefin polymer.

In one aspect, the present invention also encompasses ethylene polymers (e.g., ethylene homopolymers or ethylene copolymers) characterized by a Mw in a range from about 300,000 to about 800,000 g/mol, a relaxation time in a range from about 5 to about 50 sec, and a CY-a parameter in a range from about 0.05 to about 0.2. In another aspect, the present invention encompasses ethylene polymers characterized by a Mw in a range from about 180,000 to about 900,000 g/mol, a ratio of Mw/Mn in a range from about 8 to about 14, and a HLMI of less than or equal to about 10 g/10 min.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURE

FIG. 1 presents a plot of the molecular weight distributions of polymers produced using a Cr/silica-coated alumina catalyst, and titanated and sulfated modifications thereof.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe catalysts, compositions, processes, and methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique.

In this disclosure, while catalysts, compositions, processes, and methods are described in terms of "comprising" various components or steps, the catalysts, compositions, processes, and methods also can "consist essentially of" or "consist of" the various components or steps, unless stated otherwise.

The terms "a," "an," and "the" are intended to include plural alternatives, e.g., at least one. For instance, the disclosure of "an olefin comonomer," "a chromium-containing compound," etc., is meant to encompass one, or mixtures or combinations of more than one, olefin comonomer, chromium-containing compound, etc., unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers.

A "soluble" material is meant to indicate that the material is dissolved at standard temperature (25° C.) and pressure (1 atm); in this regard, there is no visual precipitation of the material in the solvent (e.g., water or hydrocarbon solvent). Likewise, a "solution" is meant to indicate that there is no visual precipitate at standard temperature and pressure.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses, in certain aspects, that the chromium catalyst can have a total pore volume in a range from about 0.6 to about 3 mL/g. By a disclosure that the chromium catalyst can have a total pore volume in a range from about 0.6 to about 3 mL/g, the intent is to recite that the total pore volume can be any amount within the range and, for example, can be equal to about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.7, about 2.8, about 2.9, or about 3 mL/g. Additionally, the total pore volume can be within any range from about 0.6 to about 3 mL/g (for example, the total pore volume can be in a range from about 1 to about 2 mL/g), and this also includes any combination of ranges between about 0.6 and about 3 mL/g. Further, in all instances, where "about" a particular value is disclosed, then that value itself is disclosed. Thus, the disclosure of a pore volume from about 0.6 to about 3 mL/g also discloses a pore volume range from 0.6 to 3 mL/g (for example, from 1 to 2 mL/g), and this also includes any combination of ranges between 0.6 and 3 mL/g. Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, and often within 5% of the reported numerical value.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Conventional hexavalent chromium/silica catalysts have acceptable catalytic activity for olefin polymerizations, whereas hexavalent chromium/alumina catalysts have very poor catalytic activity. Thus, it would be unexpected for supported chromium catalysts using a combination of silica and alumina, such as silica-coated alumina, to have catalytic activity in excess of that achieved with chromium/silica catalysts. In fact, previous investigations have demonstrated that hexavalent chromium/silica-coated alumina catalysts also had poor catalytic activity, and were significantly inferior to traditional chromium/silica catalysts. Thus, one of ordinary skill in the art would conclude that hexavalent chromium/silica-coated alumina catalysts offer no advantages to chromium/silica catalysts, and that further work on such catalysts would be wholly unproductive.

Unexpectedly, however, it was found that the use of chromium/silica-coated alumina catalysts with high silica contents, and which were calcined at relatively high temperatures, had excellent catalytic activity for olefin polymerizations, and were surprisingly superior to traditional chromium/silica catalysts. Moreover, and beneficially, these excellent catalyst activities could be achieved without the use of a co-catalyst in the olefin polymerization process. Further, olefin polymers produced using the supported chromium catalysts containing silica-coated alumina—typically with greater than 30 wt. % silica—offer a unique combination of a relatively high molecular weight, a relatively narrow molecular weight distribution, and a very low rheological Carreau-Yasuda breadth (CY-a) parameter and/or Carreau-Yasuda relaxation time.

The present invention, therefore, is generally directed to these chromium/silica-coated alumina catalysts, methods for preparing the chromium catalysts, methods for using the chromium catalysts to polymerize olefins, the polymer resins produced using such chromium catalysts, and articles produced using these polymer resins.

Processes for Forming Supported Chromium Catalysts

Aspects of this invention are directed to processes for preparing supported chromium catalysts. A first process for preparing a supported chromium catalyst can comprise (i) contacting a support comprising a silica-coated alumina containing at least about 30 wt. % silica with a chromium-containing compound in a liquid, and drying, and (ii) calcining at a peak temperature of at least about 650° C., often in an oxidizing atmosphere, to form the supported chromium catalyst. A second process for preparing a supported chromium catalyst can comprise contacting a support comprising a silica-coated alumina with a chromium-containing compound while calcining at a peak temperature of at least about 650° C., often in an oxidizing atmosphere, to form the supported chromium catalyst. The silica-coated alumina contains at least about 30 wt. % silica in the second process.

Generally, the features of the first and second processes (e.g., the support, the silica content, the chromium-containing compound, the drying conditions, the calcining conditions, and the peak temperature, among others) are independently described herein and these features can be combined in any combination to further describe the disclosed processes to produce a supported chromium catalyst. Moreover, additional process steps can be performed before, during, and/or after any of the steps in any of the processes disclosed herein, and can be utilized without limitation and in any combination to further describe these processes, unless stated otherwise. Further, any supported chromium catalysts produced in accordance with the disclosed processes are within the scope of this disclosure and are encompassed herein.

In step (i) of the first process, a support comprising a silica-coated alumina containing at least about 30 wt. % silica can be contacted with a chromium-containing compound in a liquid, and then dried. For the chromium impregnation in step (i), the support, the chromium-containing compound, and the liquid can be contacted in any order or sequence. In one aspect, for instance, the support and the liquid can be combined first, followed by contacting the chromium-contacting compound with the resulting slurry of the support, while in another aspect, the chromium-containing compound and the liquid can be combined first, followed by contacting the support with the mixture—solution or slurry—of the chromium-containing compound and the liquid.

The liquid can comprise water or any suitable organic solvent. Illustrative organic solvents can include, but are not limited to alcohols (e.g., methanol, ethanol, n-propanol, isopropanol, n-butanol, isobutanol, pentanol, hexanol, heptanol, octanol, benzyl alcohol, phenol, cyclohexanol, etc.), ketones (e.g., acetone, ethyl methyl ketone, etc.), aliphatic hydrocarbons (e.g., pentane, hexane, heptane, octane, decane, etc.), aromatic hydrocarbons (e.g., benzene, toluene, xylene, ethylbenzene, etc.), and the like. Additionally, combinations of two or more organic solvents can be used.

Depending upon the selection of the liquid and the chromium-containing compound, the chromium-containing compound may be soluble or insoluble. In some aspects, the chromium-containing compound can be soluble in water, while in other aspects, the chromium-containing compound can be soluble in the organic solvent.

Any suitable chromium-containing compound (or chromium precursor) can be used to form the supported chromium catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) napthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well combinations thereof.

While not required, it can be beneficial for the chromium-containing compound to be soluble in the organic solvent, which often can improve pore preservation. In such situations, the chromium-containing compound can comprise tertiary butyl chromate, chromium trioxide, ammonium chromate, ammonium dichromate, a diarene chromium (0) compound, bis-cyclopentadienyl chromium (II), chromium (III) acetylacetonate, chromium acetate, and the like, or any combination thereof.

Similarly, and not required, it can be beneficial for the chromium-containing compound to be soluble in water, which often can result in cost efficient processing. In such situations, the chromium-containing compound can comprise chromium trioxide, chromium acetate, chromium nitrate, and the like, or any combination thereof.

The contacting step of the first process—in which the support and the chromium-containing compound are combined in a liquid—can be conducted at any suitable temperature and for any suitable period of time. Representative and non-limiting ranges for the temperature of the contacting step can include from about 5° C. to about 80° C., from about 15° C. to about 60° C., from about 10° C. to about 40° C., or from about 20° C. to about 50° C. These temperature ranges also are meant to encompass circumstances where the combining step is performed at a series of different temperatures, instead of at a single fixed temperature, falling within the respective temperature ranges, wherein at least one temperature is within the recited ranges.

Similarly, the time period for contacting the support, the chromium-containing compound, and the liquid is not particularly limited, and can be conducted for any suitable period of time. In some aspects, the time period can be least about 30 seconds, at least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

Subsequent drying of the chromium impregnated support can encompass a wide range of drying times, drying temperatures, and drying pressures. For example, the drying time can range from about 1 to about 48 hours, from about 2 to about 24 hours, or from about 2 to about 12 hours, and the drying temperature can range from about 15° C. to about 200° C., from about 25° C. to about 150° C., or from about 50° C. to about 125° C. The drying pressure can be at or around atmospheric pressure, but in many instances, the drying step can be conducted under vacuum conditions at any suitable sub-atmospheric pressure, such as less than 100 torr (13.3 kPa), less than 50 (6.67 kPa) torr, or less than 10 torr (1.33 kPa).

Various types of dryer devices can be used for the drying step, such as tray dryers, rotary dryers, fluidized bed dryers, and spray dryers, although not limited thereto. Likewise, the flow of the drying medium (gas flow) relative to the solid support is not particularly limited, and encompasses concurrent flow, countercurrent flow, and flow through (e.g., such as in a fluidized bed).

In some aspects of this invention, the drying step can comprise spray drying. Generally, spray drying can be used to transform the wet chromium impregnated support (e.g., a slurry or suspension in a liquid, such as water) to a dried particulate or powder form by spraying a feed stream containing the wet chromium impregnated support into a device containing a hot drying gas (usually air), in which the residual liquid (e.g., water) evaporates from the solid support.

In the spray drying process, the feed stream can be sprayed into a drying chamber in the form of droplets, and contacted with a large volume of a hot gas, which directly contacts the wet solid support. Typical gas inlet temperatures range from 125° C. to about 800° C., or from about 150° C. to about 500° C., but are not limited thereto. The flow of the gas relative to the flow of the solid support into the spray dryer can be concurrent flow, countercurrent flow, or mixed flow. After drying, the gas stream and the dried chromium impregnated solid support are separated. If needed, fines can be removed in filter collectors or cyclones. The dried solid support can have the form of free-flowing particulate solids.

The initial feed into the spray dryer can be subjected to an atomization process, which can employ, for instance, a high-pressure nozzle, a two-fluid nozzle, or a high-speed centrifugal disk. High-pressure nozzles result in atomization by forcing the solid support slurry under high pressure through a small nozzle orifice, the size of which can depend on the desired pressure and particle size of the solids in the slurry, among other factors. Wear on the nozzle orifice and plugging can result during long-term operation; therefore, regular maintenance can be beneficial to ensure proper atomization. Two-fluid nozzles have the advantage of a relatively low operating pressure, and often can be used when the feed stream is a thick or high-solids slurry, which does not work well in high-pressure nozzle systems. The atomizing fluid can be steam or air.

High-speed centrifugal disks atomize the solid support slurry by contacting the slurry with a rapidly rotating disk. Disk diameter and disk speed (e.g., 3,000 rpm and above) can be varied to produce a suitable droplet size for drying. Beneficially, disk atomization is not subject to wear and plugging, as in the nozzle systems. Disk rotation can be driven by any suitable motor or technique.

Regardless of the atomization process, the spray drying process can be configured to maintain the spherical nature of the chromium impregnated solid support. The average particle size of the solid support can be maintained in many instances, and generally, the average particle size depends upon the atomization process, the solids content of the solid support feed stream, feed stream viscosity, and feed rate, among other factors. Likewise, bulk density of the dried chromium impregnated support can be controlled based on operating conditions of the spray dryer, such as droplet size, inlet gas temperature, and air turbulence, among other factors.

Mixing of the gas stream (e.g., air) and the droplet in the drying chamber can be accomplished, for example, using concurrent flow of gas and solids (e.g., horizontal or vertical spray dryers), or countercurrent flow of gas and solids. In the latter case, upward air flow can carry fines to the top of the chamber for easy removal. Mixed flow spray dryers combine countercurrent and concurrent drying, with complex flow patterns and high turbulence for efficient heat and mass transfer.

A benefit to spray drying can be the short contact time of the chromium impregnated support to elevated temperatures in the drying chamber. Thus, in addition to average particle size, the spray drying process can be configured to produce dried chromium impregnated supports (and subsequent supported chromium catalysts) that have surface areas and pore volumes that are comparable to the starting material (i.e., prior to spray drying).

In step (ii) of the first process, the dried product of step (i) can be calcined to form a supported chromium catalyst, and the calcining step can be conducted at a variety of temperatures and time periods. While not limited thereto, the peak temperature can be at least about 650° C., at least about 700° C., at least about 725° C., or at least about 750° C. Additionally or alternatively, the maximum peak temperature can be about 900° C., about 871° C., about 850° C., or about 800° C. Generally, the peak calcining temperature can be in a range from any minimum temperature disclosed herein to any maximum temperature disclosed herein. Therefore, the peak temperature can fall within one or more of the following non-limiting ranges: from about 650° C. to about 900° C., from about 650° C. to about 871° C., from about 650° C. to about 850° C., from about 650° C. to about 800° C., from about 650° C. to about 700° C., from about 700° C. to about 900° C., from about 700° C. to about 871° C., from about 700° C. to about 850° C., from about 700° C. to about 800° C., from about 725° C. to about 900° C., from about 750° C. to about 871° C., and/or from about 750° C. to about 850° C.

In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges, wherein at least one temperature is within the recited ranges.

The duration of the calcining step is not limited to any particular period of time. Hence, the calcining step can be conducted, for example, in a time period ranging from as little as 15-45 minutes to as long as 36-48 hours, or more. The appropriate calcining time can depend upon, for example, the initial/peak calcining temperature, among other variables. Generally, however, the calcining step can be conducted in a time period that can be in a range from about 15 minutes to about 48 hours, such as, for example, from about 15 minutes to about 24 hours, from about 30 minutes to about 12 hours, from about 1 hour to about 10 hours, or from about 2 hours to about 8 hours.

Consistent with this invention, the calcining often can be conducted at a peak temperature of at least about 650° C. in any suitable oxidizing atmosphere, for instance, an atmosphere that comprises (or consists essentially of, or consists of) oxygen. In some aspects, the calcining atmosphere can comprise air, while in other aspects, the calcining atmosphere can comprise a mixture of air and nitrogen. Yet, in certain aspects, the calcining atmosphere can be comprise oxygen and an inert gas, such as nitrogen and/or argon.

However, the calcining at a peak temperature of at least about 650° C. does not have to occur in an oxidizing atmosphere. Consistent with this invention, the calcining can be conducted at a peak temperature of at least about 650° C. in a non-oxidizing atmosphere (e.g., nitrogen), following by calcining in an oxidizing atmosphere at a temperature of less than the peak temperature, and in some instances, as low as 500° C.

The calcining conditions used in the process disclosed herein are generally selected to convert at least a portion—typically, 50 wt. % or more—of the chromium to hexavalent chromium (+6).

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

Referring now to the second process for preparing a supported chromium catalyst, in which a support comprising a silica-coated alumina (containing at least about 30 wt. % silica) can be contacted with a chromium-containing compound while calcining at a peak temperature of at least about 650° C., optionally in an oxidizing atmosphere, to form the supported chromium catalyst. Any features of the calcining step in the second process can be the same as any features disclosed herein for the first process for preparing a supported chromium catalyst. For instance, the calcining in the second process can be performed in an oxidizing atmosphere that comprises air, a mixture of air and nitrogen, or a mixture of oxygen and an inert gas, and the like. The peak calcining temperature in the second process can be any temperature in the range from about 650° C. to about 900° C., such as from about 650° C. to about 800° C., from about 700° C. to about 850° C., and the like. As one of skill in the art would recognize, the second process encompasses circumstances in which the support and the chromium-containing compound are contacted (e.g., pre-mixed) at a lower temperature to form a mixture, before calcining the mixture at the peak temperature.

Any suitable chromium-containing compound can be used in the second process for preparing a supported chromium catalyst. Representative and non-limiting examples of the chromium-compound compound include chromium (III) acetate, basic chromium (III) acetate, chromium (III) acetylacetonate, $Cr_2(SO_4)_3$, $Cr(NO_3)_3$, and/or $CrO_3$. Combinations of two or more chromium-containing compounds can be used in the second process.

Referring now to both the first process and the second process, the amount of chromium in the supported chromium catalyst is not particularly limited. Generally, however, the amount of chromium in the supported chromium catalyst can range from about 0.1 to about 15 wt. %; alternatively, from about 0.2 to about 10 wt. %; alternatively, from about 0.5 to about 15 wt. %; alternatively, from about 0.5 to about 5 wt. %; alternatively, from about 0.5 to about 2.5 wt. %; alternatively, from about 0.75 to about 10 wt. %; or alternatively, from about 1 to about 4 wt. %. These weight percentages are based on the amount of chromium relative to the total weight of the supported catalyst.

The total pore volume of the supported chromium catalyst also is not particularly limited. For instance, the supported chromium catalyst can have a total pore volume in a range from about 0.5 to about 5 mL/g, from about 0.5 to about 2 mL/g, from about 1 to about 5 mL/g, from about 0.6 to about 3 mL/g, from about 0.8 to about 1.6 mL/g, from about 1 to about 2 mL/g, or from about 1 to about 1.5 mL/g. Likewise, the surface area of the supported chromium catalyst is not limited to any particular range. Generally, however, the supported chromium catalyst can have a BET surface area in a range from about 200 to about 700 $m^2/g$, from about 250 to about 550 $m^2/g$, from about 275 to about 525 $m^2/g$, from about 275 to about 550 $m^2/g$, from about 300 to about 525 $m^2/g$, or from about 320 to about 510 $m^2/g$. BET surface areas are determined using the BET nitrogen adsorption method of Brunaur et al., *J. Am. Chem. Soc.*, 60, 309 (1938). Total pore volumes are determined in accordance with Halsey, G. D., *J. Chem. Phys.* (1948), 16, pp. 931.

The supported chromium catalyst can have any suitable particle size, as would be recognized by those of skill in the art. Illustrative and non-limiting ranges for the average (d50) particle size of the supported chromium catalyst can include from about 10 to about 500 microns, from about 25 to about 250 microns, from about 30 to about 100 microns, from about 40 to about 160 microns, or from about 40 to about 120 microns. The d50 particle size, or median or average particle size, refers to the particle size for which 50% of the sample has a smaller size and 50% of the sample has a larger size, and is determined using laser diffraction in accordance with ISO 13320.

Generally, at least about 50 wt. % of the chromium in the supported chromium catalyst is present in an oxidation state of +6 (VI). In further aspects, at least about 65 wt. %, at least about 75 wt. %, at least about 85 wt. %, or at least about 90 wt. %, of the chromium in the supported chromium catalyst can be present in an oxidation state of +6. Such chromium catalysts often will have an orange color.

The support utilized in the first and second process can comprise (or consist essentially of, or consist of) a silica-coated alumina and, therefore, the supported chromium catalyst can comprise (or consist essentially of, or consist of) chromium/silica-coated alumina. The silica-coated alumina of the first and second processes can contain at least about 30 wt. % silica. In one aspect, for instance, the silica content of the silica-coated alumina can be from about 30 to about 95 wt. %, from about 35 to about 95 wt. %, from about 70 to about 95 wt. %, from about 70 to about 90 wt. %, or from about 85 to about 95 wt. %, based on the weight of the silica-coated alumina. In another aspect, such silica-coated aluminas can have silica contents ranging from about 35 to about 75 wt. %, from about 35 to about 60 wt. %, from about 35 to about 45 wt. %, or from about 40 to about 70 wt. % silica. The silica-coated aluminas can have any suitable surface area, pore volume, and particle size, such as those disclosed hereinabove for the supported chromium catalyst. Methods for preparing silica-coated alumina materials are described, for instance, in U.S. Pat. Nos. 7,884,163 and 9,023,959, incorporated herein by reference in their entirety.

Optionally, the supported chromium catalyst can be modified or treated—such as titanated, fluorided, sulfated, sulfided, phosphated, and the like—in order to impact the resultant polymer properties, for instance, to produce an ethylene polymer with a lower molecular weight and a higher melt index. As an example, the support in the first and second processes can comprise a titanated (or fluorided, or sulfated, or sulfided, and/or phosphated, etc.) silica-coated alumina. In such circumstances, the support has already been modified or treated prior to combining the support with the chromium-containing compound. Alternatively, the step of contacting the support with the chromium-containing compound (whether combining in a liquid, or combining while calcining) can comprise contacting the support—e.g., silica-coated alumina—with the chromium-containing compound and a titanating agent (or fluoriding agent, or sulfating agent, or sulfiding agent, and/or phosphating agent, etc.). Alternatively, the supported chromium catalyst, after calcining, can be further titanated (or fluorided, or sulfated, or sulfided, and/or phosphated, etc.). As one of skill in the art would recognize, there are numerous techniques for preparing a titanated (or fluorided, or sulfated, or sulfided, and/or phosphated, etc.) chromium catalyst, and such techniques are encompassed herein.

Thus, in one aspect of this invention, the supported chromium catalyst can comprise chromium/titanated silica-coated alumina. Typical titanium contents often range from about 0.5 to about 20 wt. %; alternatively, from about 1 to about 15 wt. %; or alternatively, from about 3 to about 9 wt. %, based on the amount of titanium relative to the total weight of the chromium/titanated silica-coated alumina catalyst. In another aspect, the supported chromium catalyst can comprise chromium/sulfated silica-coated alumina, which often can produce an olefin polymer with a relatively narrow molecular weight distribution. Typical sulfate contents often range from about 1 to about 20 wt. %; alternatively, from about 2 to about 15 wt. %; or alternatively, from about 5 to about 10 wt. %, based on the amount of sulfate relative to the total weight of the chromium/sulfated silica-coated alumina catalyst. In yet another aspect, the supported chromium catalyst can comprise chromium/sulfided silica-coated alumina. Typical sulfide treatments often can involve exposure to a sulfur-containing compound in an amount of at least 1 S/Cr, at least 5 S/Cr, or at least 10 S/Cr, and often as high as 15-20 S/Cr, at an elevated temperature. In still another aspect, the supported chromium catalyst can comprise chromium/phosphated silica-coated alumina. Typical phosphate contents often range from about 3 to about 30 wt. %; alternatively, from about 3 to about 25 wt. %; or alternatively, from about 10 to about 25 wt. %, based on the amount of phosphate relative to the total weight of the chromium/phosphated silica-coated alumina catalyst.

While the supported chromium catalyst also can comprise chromium/fluorided silica-coated alumina, particular aspects of this invention are directed to the production of a supported chromium catalyst in which the supported chromium catalyst is chromium/silica-coated alumina. This chromium/silica-coated alumina catalyst is substantially free of F (containing less than 0.5 wt. % F, and more often, containing less than 0.1 wt. % F, or less than 0.05 wt. % F).

Unexpectedly, the supported chromium catalysts (e.g., chromium/silica-coated alumina, chromium/titanated silica-coated alumina, chromium/sulfated silica-coated alumina, etc.) disclosed herein have very high catalyst activity. For instance, the catalyst activity of the supported chromium catalyst can be greater than about 3000 grams, greater than about 4000 grams, greater than about 5000 grams, greater than about 6000 grams, greater than about 7000 grams, or greater than about 9000 grams of polyethylene per gram of the supported chromium catalyst per hour (g/g/hr), and often as high as 10,000-15,000 g/g/hr. These catalyst activities are determined under slurry polymerization conditions, with no co-catalyst, using isobutane as a diluent, and with a polymerization temperature of 105° C. and a reactor pressure of 550 psig.

Additionally, the catalyst activity of any supported chromium catalyst prepared as described herein can be greater (e.g., at least 15% greater, at least 25% greater, at least 50% greater, at least 100%, at least 200% greater, at least 300% greater, etc.) than that of an otherwise identical catalyst obtained using a peak calcining temperature of about 625° C. or less, under the same polymerization conditions, such as slurry polymerization at a temperature of 105° C., at a reactor pressure of 550 psig, no co-catalyst, etc. Thus, the only difference is the peak calcining temperature. Further, the catalyst activity of any supported chromium catalyst prepared as described herein can be greater (e.g., at least 15% greater, at least 25% greater, at least 50% greater, at least 100%, at least 200% greater, at least 300% greater, etc.) than that of an otherwise identical catalyst obtained using a silica-coated alumina containing 28 wt. % silica or less, under the same polymerization conditions, such as slurry polymerization at a temperature of 105° C., at a reactor pressure of 550 psig, no co-catalyst, etc. Thus, the only difference is the silica content of the silica-coated alumina support. Thus, in some aspects, the catalyst activity of any supported chromium catalyst prepared as described herein can be greater (e.g., at least 15% greater, at least 25% greater, at least 50% greater, at least 100%, at least 200% greater, at least 300% greater, etc.) than that of an otherwise identical catalyst obtained using silica (instead of silica-coated alumina), under the same polymerization conditions, such as slurry polymerization at a temperature of 105° C., at a reactor pressure of 550 psig, no co-catalyst, etc. Thus, the only difference is the Cr/silica-coated alumina versus Cr/silica (same calcining temperature, catalyst surface area and pore volume, etc.).

An illustrative and non-limiting example of a chromium/silica-coated alumina catalyst consistent with aspects of this invention can comprise from about 0.01 to about 20 wt. % chromium (based on the weight of the catalyst), and a silica-coated alumina containing at least about 30 wt. % silica (based on the weight of the silica-coated alumina). This catalyst can be characterized by a pore volume from about 0.5 to about 2 mL/g, and a BET surface area from about 275 to about 550 $m^2/g$. This catalyst also can have any of the features disclosed herein for supported chromium catalysts, and in any combination. For instance, the chromium/silica-coated alumina catalyst can contain from about 0.1 to about 15 wt. %, from about 0.2 to about 10 wt. %, from about 0.5 to about 5 wt. %, or from about 0.5 to about 2.5 wt. % chromium. Additionally, the silica-coated alumina can contain from about 30 to about 95 wt. %, from about 35 to about 95 wt. %, from about 35 to about 75 wt. %, from about 35 to about 45 wt. %, from about 70 to about 95 wt. %, or from about 40 to about 70 wt. % silica.

Further, the chromium/silica-coated alumina catalyst can be characterized by a relatively low pore volume (total) ranging from about 0.5 to about 2 mL/g, from about 0.6 to about 1.8 mL/g, from about 0.8 to about 1.6 mL/g, from about 1 to about 2 mL/g, or from about 1 to about 1.5 mL/g, while the relatively high BET surface area of the catalyst can range from about 275 to about 550 $m^2/g$, from about 275 to about 525 $m^2/g$, from about 300 to about 525 $m^2/g$, or from about 320 to about 510 $m^2/g$.

Likewise, the chromium/silica-coated alumina catalyst can be characterized by unexpectedly high catalytic activity (particularly given the relatively low pore volume), which is generally greater than about 3000 grams, greater than about 4000 grams, greater than about 5000 grams, greater than about 7000 grams, or greater than about 9000 grams (and up to about 10,000, up to about 12,000, or up to about 14,000 grams), of polyethylene per gram of the catalyst per hour, under slurry polymerization conditions, with no co-catalyst, using isobutane as a diluent, and with a polymerization temperature of 105° C. and a reactor pressure of 550 psig.

Polymerization Processes

Supported chromium catalysts of the present invention can be used to polymerize olefins to form homopolymers, copolymers, terpolymers, and the like. One such process for polymerizing olefins can comprise contacting any supported chromium catalyst disclosed herein (e.g., produced by any process disclosed herein) with an olefin monomer and an optional olefin comonomer in a polymerization reactor system under polymerization conditions to produce an olefin polymer.

In one aspect of this invention, the catalyst compositions and/or the polymerization processes disclosed herein do not employ a co-catalyst. This can be beneficial for producing an olefin polymer with a relatively narrow molecular weight distribution. In another aspect, substantially no co-catalyst can be used, which is less than 5 ppm (by weight), and in some instances, less than 2 ppm, less than 1 ppm, less than 0.5 ppm, or less than 0.3 ppm, of the co-catalyst can be used. These ppm amounts can be based on the weight of the total reactor contents in some aspects, or can be based on the weight of the diluent in the reactor in other aspects.

In yet another aspect, a traditional loading of a co-catalyst can be used in the polymerization process. The co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than one co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane (TEB), and the like, or any combination thereof. Co-catalysts that can be used in the catalyst compositions and/or the polymerization processes of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Unsaturated monomers that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent, based on the total weight of the monomer and comonomer. According to another aspect of the present invention, the amount of comonomer introduced into a polymerization reactor system can be from about 0.01 to about 40 weight percent comonomer, based on the total weight of the monomer and comonomer, or alternatively, from about 0.1 to about 35 weight percent comonomer, or from about 0.5 to about 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

The supported chromium catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, from about 60° C. to about 185° C., from about 60° C. to about 120° C., or from about 130° C. to about 180° C., depending upon the type of polymerization reactor, the polymer grade, and so forth. In some reactor systems, the polymerization reactor temperature generally can be within a range from about 70° C. to about 110° C., or from about 125° C. to about 175° C. Various polymerization conditions can be held substantially constant, for example, for the production of a particular grade of olefin polymer.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at about 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)).

Operation above the critical point of a pressure/temperature diagram (supercritical phase) can offer advantages to the polymerization reaction process.

Aspects of this invention also are directed to olefin polymerization processes conducted in the absence of added hydrogen. An olefin polymerization process of this invention can comprise contacting a supported chromium catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a supported chromium catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests.

Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Olefin polymers, such as ethylene polymers, produced in accordance with this invention can have a high load melt index (HLMI) of less than or equal to about 50. In one aspect, the HLMI of the ethylene polymer can be less than or equal to about 25, less than or equal to about 10, less than or equal to about 5, less than or equal to about 2, or less than or equal to about 1 g/10 min. In another aspect, the HLMI of the ethylene polymer can be at least about 10, at least about 20, or at least about 30 g/10 min.

The densities of ethylene-based polymers produced using the supported chromium catalysts and the processes disclosed herein often are greater than or equal to about 0.89 g/cm$^3$. In one aspect of this invention, the density of the ethylene polymer can be in a range from about 0.90 to about 0.97 g/cm$^3$. Yet, in another aspect, the density can be in a range from about 0.91 to about 0.96 g/cm$^3$, such as, for example, from about 0.92 to about 0.96 g/cm$^3$, from about 0.93 to about 0.955 g/cm$^3$, or from about 0.94 to about 0.955 g/cm$^3$.

Generally, the weight-average molecular weight (Mw) of the olefin polymer can fall within a range from about 180,000 to about 900,000 g/mol. In some aspects, the Mw can be from about 200,000 to about 900,000 g/mol; alternatively, from about 180,000 to about 300,000 g/mol; alternatively, from about 200,000 to about 700,000 g/mol; alternatively, from about 300,000 to about 800,000 g/mol; alternatively, from about 400,000 to about 800,000 g/mol; or alternatively, from about 500,000 to about 750,000 g/mol.

In an aspect, the olefin polymer (e.g., an ethylene polymer) can have a ratio of Mw/Mn in a range from about 8 to about 50, from about 8 to about 25, from about 8 to about 14, from about 10 to about 25, or from about 10 to about 20, but is not limited thereto. Likewise, the ratio of Mz/Mw of the olefin polymer is not particularly limited, but often can range from about 4 to about 10, from about 4 to about 9, from about 5 to about 10, or from about 5 to about 9.

Unexpectedly, the olefin polymers disclosed herein have relatively low relaxation times and CY-a parameters. In one aspect, the olefin polymer (e.g., ethylene polymer) can have a relaxation time (z, in sec) in a range from about 3 to about 50 sec, and from about 5 to about 50 sec in another aspect, and from about 5 to about 25 sec in yet another aspect. Additionally or alternatively, the olefin polymer (e.g., ethylene polymer) can have a CY-a parameter in a range from about 0.05 to about 0.2 in one aspect, from about 0.05 to about 0.18 in another aspect, and from about 0.08 to about 0.15 in yet another aspect.

An illustrative and non-limiting example of a first ethylene polymer (e.g., an ethylene homopolymer or ethylene copolymer) of the present invention can have a Mw in a range from about 300,000 to about 800,000 g/mol, a relaxation time in a range from about 5 to about 50 sec, and a CY-a parameter in a range from about 0.05 to about 0.2. This first ethylene polymer can be further characterized by a Mw within a range from about 300,000 to about 600,000 g/mol, from about 325,000 to about 550,000 g/mol, or from about 500,000 to about 750,000 g/mol; additionally or alternatively, a relaxation time in a range from about 5 to about 25 sec, from about 10 to about 50 sec, or from about 10 to about 45 sec; and additionally or alternatively, a CY-a parameter in a range from about 0.07 to about 0.18, from about 0.08 to about 0.17, or from about 0.09 to about 0.15.

In some aspects, the first ethylene polymer can have a ratio of Mw/Mn in a range from about 10 to about 25, from about 12 to about 22, or from about 14 to about 20. Additionally or alternatively, the first ethylene polymer can have a ratio of Mz/Mw ranging from about 4 to about 10, from about 4.5 to about 9, or from about 5 to about 8. Additionally or alternatively, the first ethylene polymer can have a HLMI of less than or equal to about 10, less than or equal to about 6, or less than or equal to about 3 g/10 min. While not limited thereto, the density of the first ethylene polymer can fall within a range from about 0.935 to about 0.96 g/cm$^3$, or from about 0.94 to about 0.955 g/cm$^3$.

An illustrative and non-limiting example of a second ethylene polymer (e.g., an ethylene homopolymer or ethylene copolymer) of the present invention can have a Mw in a range from about 180,000 to about 900,000 g/mol, a ratio of Mw/Mn in a range from about 8 to about 14, and a HLMI of less than or equal to about 10 g/10 min. This second ethylene polymer can be further characterized by a Mw in a range from about 180,000 to about 400,000 g/mol, from about 180,000 to about 300,000 g/mol, or from about 190,000 to about 270,000 g/mol; additionally or alternatively, a ratio of Mw/Mn in a range from about 9 to about 14, from about 9.5 to about 14, or from about 10 to about 13.5; and additionally or alternatively, a HLMI of less than or equal to about 9, less than or equal to about 8, or less than or equal to about 5 g/10 min.

In some aspects, the second ethylene polymer can have a ratio of Mz/Mw ranging from about 5 to about 10, from about 6 to about 9, or from about 6.5 to about 8.5. Additionally or alternatively, the second ethylene polymer can have a CY-a parameter in a range from about 0.09 to about 0.23, from about 0.11 to about 0.21, or from about 0.12 to about 0.2. While not limited thereto, the density of the second ethylene polymer can fall within a range from about 0.935 to about 0.96 g/cm$^3$, or from about 0.94 to about 0.955 g/cm$^3$.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting a supported chromium catalyst (e.g., produced as described herein) and an optional co-catalyst with an olefin monomer and an optional olefin comonomer under polymerization conditions in a polymerization reactor system to produce an olefin polymer; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Melt index (MI, g/10 min) can be determined in accordance with ASTM D1238 at 190° C. with a 2.16 kg weight, and high load melt index (HLMI, I21, g/10 min) was determined in accordance with ASTM D1238 at 190° C. with a 21.6 kg weight. Density can be determined in grams per cubic centimeter (g/cm$^3$) on a compression molded sample, cooled at 15° C. per hour, and conditioned for 40 hours at room temperature in accordance with ASTM D1505 and ASTM D4703.

BET surface areas can be determined using the BET nitrogen adsorption method of Brunaur et al., *J. Am. Chem. Soc.*, 60, 309 (1938). Total pore volumes can be determined in accordance with Halsey, G. D., *J. Chem. Phys.* (1948), 16, pp. 931. The d50 particle size, or median or average particle size, refers to the particle size for which 50% of the sample has a smaller size and 50% of the sample has a larger size, and can be determined using laser diffraction in accordance with ISO 13320.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection.

An injection volume of about 200 μL was used. The integral calibration method was used to deduce molecular weights and molecular weight distributions using a broad Chevron Phillips Chemical Company's HDPE polyethylene resin, MARLEX BHB5003, as the standard. The integral table of the standard was pre-determined in a separate experiment with SEC-MALS. Mn is the number-average molecular weight, Mw is the weight-average molecular weight, and Mz is the z-average molecular weight.

Melt rheological characterizations were performed as follows. Small-strain (10%) oscillatory shear measurements were performed on an Anton Paar MCR 501 rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η) in sec);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Examples 1-38

Polymerization Experiments Using Chromium/Silica-Coated Alumina Catalysts

Examples 1-2, 31-34, and 37 used a silica-coated alumina support containing 90 wt. % silica (BET surface area of 334 m²/g and pore volume of 1.11 mL/g), Examples 29 and 35 used a silica-coated alumina support containing 80 wt. % silica (BET surface area of 368 m²/g and pore volume of 1.26 mL/g), Examples 3-4, 30, and 36 used a silica-coated alumina support containing 70 wt. % silica (nominal BET surface area of 450 m²/g and pore volume in the 1 to 1.5 mL/g range), and Examples 5-26 used a silica-coated alumina support containing 40 wt. % silica (BET surface area of 495 m²/g and pore volume of 1.26 mL/g). Silica-coated aluminas were obtained from Sasol Corp. under the trade name Siral. Supported chromium catalysts (1 wt. % Cr) were obtained by contacting the silica-coated alumina with a solution of 1 wt. % Cr as chromium acetate in methanol, then drying at 110° C., and calcining for 3 hours as indicated in Table I.

For Examples 8-10, 2.5 wt. % F was added to the supported chromium catalyst by co-impregnating a methanol solution of ammonium bifluoride along with 1 wt. % Cr as chromium acetate. For Example 11, 3 mmol/g B(OH)₃ was added to the supported chromium catalyst by co-impregnation of an aqueous solution of boric acid and 1 wt. % Cr as chromium acetate.

For Examples 12-18, 5-7 wt. % Ti was added to the supported silica-coated alumina by first drying the support in nitrogen at 200° C. for two hours. Then, a titanium isopropoxide in heptane solution was impregnated into the support, followed by evaporation of the heptane at 100° C. in nitrogen. The thus-titanated support was then dry-mixed with 1 wt. % Cr as chromium acetylacetonate. The mixture was then calcined in air at the indicated temperature. For Example 19, 7 wt. % Ti was added in the same manner as Examples 12-18, and then 10 g were calcined in nitrogen at 830° C. for 3 hours. During this calcination step, 3 mL of carbon disulfide were evaporated into the nitrogen stream, which then passed up through the support while it was at 830° C. Afterward, this sulfide-treated calcined Ti-containing silica-coated alumina support was dry-mixed with 1 wt. % Cr as chromium acetylacetonate. Then, it was given a final calcination at 650° C. in air for 1 hour.

For Example 20, a silica-coated alumina, containing 40 wt. % silica, was further treated with more silica. That is, the support, after calcination in air for 3 hours at 600° C., was impregnated with an methanol solution of condensed ethyl silicate oligomers (Silbond 40). An additional 20 wt. % of silica was added in this manner. Before impregnation of the methanolic silicate solution, 1 wt. % Cr was also added to the solution as chromium trioxide. Then the methanol was evaporated in a vacuum oven at 110° C. overnight.

For Examples 21-22 and Example 37, 7 wt. % sulfate and 2.5 wt. % sulfate, respectively, were added to the supported chromium catalyst by co-impregnation of sulfuric acid and 1 wt. % Cr as chromium acetate, both in an aqueous solution, followed by drying overnight at 110° C. For Examples 23-26, a silica-coated alumina was first calcined in air at 600° C. for 3 hours. Then, 0.15-0.23 g/g phosphate was co-impregnated with 1 wt. % Cr in an aqueous solution of phosphoric acid and chromium acetate. Then, the catalyst was dried in an oven at 110° C. overnight. Afterward, the catalyst was calcined in air for 3 hours at the indicated temperature. However, for Example 26, the calcination was done similar to that described in Example 19 (treated with nitrogen for 3 hours at 830° C., during which 3 mL of carbon disulfide were evaporated and mixed with the 10 g catalyst bed. Then, it was cooled to 690° C. and calcined in air for 2 hours.

For comparison, a commercial Cr/silica catalyst (Example 27) and Cr/alumina catalyst (Example 28) containing 1 wt. % chromium were evaluated. Both had a surface area of 300 m²/g, a pore volume of 1.5 mL/g, and an average particle size of about 100 microns. Example 38 was prepared in a manner similar to Example 2, except traditional co-gelled silica-alumina (silica 87:13 alumina) was used instead of silica-coated alumina.

The chromium catalysts, prepared as described above, were used in polymerization experiments conducted in a 2-L stainless steel reactor. Isobutane (1.2 L) was used in all runs. Approximately 0.05-0.10 g of the activated chromium catalyst were added through a charge port while slowly venting isobutane vapor. The charge port was closed and the isobutane was added. The contents of the reactor were stirred and heated to the desired run temperature of 105° C., and ethylene was then introduced into the reactor (no comonomer, hydrogen, or co-catalyst was used, except as noted in Table I). Ethylene was fed on demand to maintain a reactor pressure of about 550 psig, and each polymerization run was conducted for 40-80 minutes.

Table I summarizes the amount of silica in the catalyst (wt. %), any treatment or modification to the catalyst, peak calcination temperature, co-catalyst (ppm by weight of the isobutane), hydrogen (mol % of the isobutane), catalyst activity (grams of polyethylene per gram of supported chromium catalyst per hour, g/g/hr), HLMI of the polymer (g/10 min), molecular weight characterization of the polymer (Mn, Mw, Mz, Mw/Mn, Mz/Mw), the rheological CY-a parameter, and the relaxation time ($\tau_\eta$ or Tau($\eta$) in sec).

Referring first to Examples 1-7 in Table I, Cr/silica-coated alumina catalysts containing 40 wt. % silica, unexpectedly, had much higher catalyst activities than similar catalysts with 70-90 wt. % silica, indicating that there may be a particularly beneficial amount of silica content of ~40 wt. % to achieve the highest catalyst activity. Also surprisingly, calcining at 650° C. (Example 5) resulted in a catalyst activity of 6900 g/g/hr; however, higher calcining temperatures in the 750-850° C. range (Examples 6-7) resulted in surprisingly high catalyst activities of 9000-11,000 g/g/hr for the 40 wt. % silica Cr/silica-coated alumina catalyst. Further, no co-catalyst was used for Examples 6-7. However, note that higher silica content can be beneficial for the production of lower molecular weight polymers (higher HLMI values).

Examples 8-10 demonstrated high catalyst activities for Cr/fluorided silica-coated alumina, but with higher activity after calcining at 650° C. as compared to 750° C. Conversely, the titanated Cr/silica-coated alumina catalysts of Examples 12-19 had generally higher catalyst activities at higher calcining temperatures (800° C.). The Cr/sulfated silica-coated alumina catalysts of Examples 21-22 had catalyst activities similar to the fluorided versions, with unexpectedly high catalyst activities at a lower calcining temperature of 650° C. (over 9000 g/g/hr). Note also that the sulfated catalyst produced polymer with the narrowest molecular weight distribution, especially considering that it contained only 40 wt. % silica. The Cr/phosphated silica-coated alumina catalysts of Examples 23-26 had catalyst activities similar to the titanated versions, with unexpectedly high catalyst activities at a higher calcining temperature of 800° C. (7000-11,000 g/g/hr). Beneficially, phosphate treatment also lowered molecular weight (increased the HLMI).

Examples 27-28 demonstrate that all of the Cr/silica-coated alumina catalysts, regardless of additional treatment or not, had far superior catalyst activity to that of traditional Cr/silica or Cr/alumina catalysts of similar surface area, pore volume, and particle size. Likewise, the chromium/silica-coated alumina of Example 2 (90 wt. % silica) had far superior catalyst activity to that of the chromium/silica-alumina of Example 38 (87 wt. % silica).

Generally, with the exception of Examples 31-37, the polymers produced using the Cr/silica-coated alumina catalysts had HLMI values of less than 12 g/10 min, and more often, less than 2 g/10 min, as shown in Table I. This is desirable for some polymer applications. The polymers had high molecular weights (Mw in the 200-700 kg/mol range, and more often, in the 300-700 kg/mol range), relatively narrow molecular weight distributions (Mw/Mn in the 10-50 range, and more often, in the 10-25 range or the 10-18 range; and Mz/Mw in the 4-9 range, and more often, in the 5-8 range), and low rheological CY-a parameters (ranging from 0.08 to 0.17, and more often, ranging from 0.09 to 0.15). Several polymers also had low relaxation times of less than 50 sec, and for some examples, less than 20 sec, which is particularly remarkable given the extremely high molecular weight. The narrow molecular weight distribution also is unusual for such high molecular weights and from Cr/aluminate (alumina-containing) catalysts. For many other polymer applications, presently serviced by Cr/silica catalysts, the higher silica grades of Cr/silica-coated alumina catalysts produced similar polymers (higher HLMI and lower Mw), but with improved catalytic activity.

FIG. 1 illustrates the molecular weight distributions (amount of polymer versus the logarithm of molecular weight) for ethylene polymers produced using a Cr/silica-coated alumina catalyst, a titanated Cr/silica-coated alumina catalyst, and a sulfated Cr/silica-coated alumina catalyst. While each polymer had a relatively high peak molecular weight (or a relatively high Mw), unexpectedly, the polymer produced with the Cr/silica-coated alumina catalyst had the broadest molecular weight distribution, followed by the polymer produced with the titanated Cr/silica-coated alumina catalyst, and then the polymer produced with the sulfated Cr/silica-coated alumina catalyst, which had the narrowest molecular weight distribution.

Examples 31-37 utilized a silica-coated alumina with a silica content in the 70-90 wt. % range. At these higher silica contents, the higher calcining temperatures of 800° C. for Examples 31-36 resulting in surprisingly higher catalyst activities as compared to examples that were calcined at lower temperatures. Further, as compared to the other examples, the polymers of Examples 31-37 generally had higher HLMI values, lower molecular weights (Mw), narrower molecular weight distributions (Mw/Mn), and lower relaxation times.

TABLE I

Summary of Examples 1-38.

| Example | Initial SiO$_2$ (wt. %) | Comments or Modification | Calcination in Air | Co-Catalyst | H$_2$ | Activity (g/g/hr) |
|---|---|---|---|---|---|---|
| 1 | 90 | None | 750° C. | None | None | 4110 |
| 2 | 90 | N$_2$ 750° C. 4 h, air 20 min 500° C. | 500° C. | None | None | 3010 |
| 3 | 70 | None | 750° C. | None | None | 3041 |
| 4 | 70 | None | 750° C. | 5 ppm TEB | None | 3656 |
| 5 | 40 | None | 650° C. | None | None | 6904 |
| 6 | 40 | None | 750° C. | None | None | 11098 |
| 7 | 40 | None | 850° C. | None | None | 9064 |
| 8 | 40 | 2.5% Fluorine | 650° C. | None | None | 10429 |
| 9 | 40 | 2.5% Fluorine | 750° C. | None | None | 4014 |
| 10 | 40 | 2.5% Fluorine | 750° C. | None | None | 4831 |
| 11 | 40 | 3 mmol/g B(OH)$_3$ | 800° C. | None | None | 5496 |
| 12 | 40 | 5% Ti Added | 600° C. | None | None | 6362 |
| 13 | 40 | 5% Ti Added | 800° C. | None | None | 5646 |
| 14 | 40 | 5% Ti Added | 800° C. | None | 0.3 mol % | 5431 |
| 15 | 40 | 5% Ti Added | 800° C. | None | None | 10320 |

TABLE I-continued

Summary of Examples 1-38.

| Example | | | | | | |
|---|---|---|---|---|---|---|
| 16 | 40 | 5% Ti Added | 800° C. | None | None | 6459 |
| 17 | 40 | 5% Ti Added | 800° C. | None | None | 5626 |
| 18 | 40 | 7% Ti Added | 800° C. | None | None | 6072 |
| 19 | 40 | 7% Ti Added, $CS_2$ 830° C. | 650° C. | None | None | 6185 |
| 20 | 40 | Added 20% more $SiO_2$ | 800° C. | None | None | 4300 |
| 21 | 40 | 7% $H_2SO_4$ Added | 650° C. | None | None | 9564 |
| 22 | 40 | 7% $H_2SO_4$ Added | 750° C. | None | None | 4393 |
| 23 | 40 | 0.15 g/g $H_3PO_4$ added | 650° C. | None | None | 3123 |
| 24 | 40 | 0.23 g/g $H_3PO_4$ added | 800° C. | None | None | 11465 |
| 25 | 40 | 0.23 g/g $H_3PO_4$ added | 800° C. | None | None | 7050 |
| 26 | 40 | 0.23 g/g $H_3PO_4$, $CS_2$ 830° C. | 690° C. | None | None | 2324 |
| 27 | 100 | Cr/silica | 700° C. | None | None | 2001 |
| 28 | 0 | Cr/alumina | 600° C. | None | None | 321 |
| 29 | 80 | None | 740° C. | None | None | 712 |
| 30 | 70 | None | 750° C. | None | None | 2646 |
| 31 | 90 | None | 800° C. | None | None | 3870 |
| 32 | 90 | None | 800° C. | None | None | 5287 |
| 33 | 90 | 95° C., 20 mL 1-hexene | 800° C. | None | None | 4773 |
| 34 | 90 | 95° C., 20 mL 1-hexene | 800° C. | None | None | 2961 |
| 35 | 80 | None | 800° C. | None | None | 2809 |
| 36 | 70 | None | 800° C. | None | None | 4525 |
| 37 | 90 | 2.5% $H_2SO_4$ Added | 750° C. | None | None | 3440 |
| 38 | 87 | $N_2$ 750° C. 4 h, air 20 min 500° C. | 500° C. | None | None | 377 |

| Example | HLMI (g/10 min) | Mn (kg/mol) | Mw (kg/mol) | Mz (kg/mol) | Mw/Mn | Mz/Mw | CY-a Parameter | Relaxation Time (sec) |
|---|---|---|---|---|---|---|---|---|
| 1 | 11.9 | 19.2 | 234 | 1979 | 12.2 | 8.5 | 0.168 | 10 |
| 2 | 33.4 | | | | | | | |
| 3 | 1.7 | 18.0 | 346 | 2317 | 19.3 | 6.7 | 0.109 | 41 |
| 4 | 2.27 | 9.4 | 411 | 2929 | 44.0 | 7.1 | 0.090 | 1095 |
| 5 | 0.43 | 12.1 | 578 | 3476 | 47.7 | 6.0 | | |
| 6 | 0.11 | 27.0 | 673 | 3436 | 25.0 | 5.1 | | |
| 7 | | 24.2 | 600 | 3250 | 24.8 | 5.4 | | |
| 8 | 0.01 | | | | | | | |
| 9 | 0.10 | | | | | | | |
| 10 | 0.07 | | | | | | | |
| 11 | 0.38 | | | | | | | |
| 12 | 0.05 | 25.3 | 576 | 2847 | 22.8 | 4.9 | 0.112 | 3044 |
| 13 | 0.14 | 27.9 | 486 | 2612 | 17.4 | 5.4 | 0.115 | 273 |
| 14 | 0.67 | 29.4 | 515 | 2882 | 17.5 | 5.6 | 0.141 | 15 |
| 15 | 0.63 | | | | | | | |
| 16 | | | | | | | | |
| 17 | | | | | | | | |
| 18 | 0.28 | | | | | | | |
| 19 | 0.98 | | | | | | | |
| 20 | 0.47 | | | | | | | |
| 21 | 0.06 | | | | | | | |
| 22 | 0.31 | 18.8 | 212 | 1573 | 11.3 | 7.4 | | |
| 23 | 0.42 | | | | | | | |
| 24 | 1.04 | | | | | | | |
| 25 | | | | | | | | |
| 26 | 2.03 | | | | | | | |
| 27 | 10.7 | 26.1 | 249 | 1547 | 9.6 | 6.2 | 0.185 | 6 |
| 28 | | 96.3 | 364 | 4211 | 3.8 | 11.6 | 0.196 | 105 |
| 29 | 4.8 | | | | | | | |
| 30 | 5.0 | 22.0 | 342 | 2386 | 15.5 | 7.0 | 0.113 | 14 |
| 31 | 74.9 | 14.0 | 137 | 1201 | 9.8 | 8.8 | 0.141 | 0.7 |
| 32 | 28.8 | 19.2 | 164 | 1236 | 8.5 | 7.6 | 0.150 | 3 |
| 33 | 7.2 | 14.8 | 196 | 1511 | 13.3 | 7.7 | 0.134 | 193 |
| 34 | 8.7 | 18.0 | 196 | 1504 | 10.9 | 7.7 | 0.144 | 74 |
| 35 | 7.2 | 24.5 | 247 | 1798 | 10.1 | 7.3 | 0.184 | 6 |
| 36 | 14.0 | 20.9 | 213 | 1724 | 10.2 | 8.1 | 0.165 | 5 |
| 37 | 9.8 | 19.5 | 208 | 1457 | 10.7 | 7.0 | 0.174 | 7 |
| 38 | 12.7 | | | | | | | |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process for preparing a supported chromium catalyst, the process comprising:

(i) contacting a support comprising a silica-coated alumina containing at least about 30 wt. % silica with a chromium-containing compound in a liquid, and drying; and (ii) calcining at a peak temperature of at least about 650° C., optionally in an oxidizing atmosphere, to form the supported chromium catalyst.

Aspect 2. The process defined in aspect 1, wherein the liquid comprises water.

Aspect 3. The process defined in aspect 1, wherein the liquid comprises any suitable organic solvent or any organic solvent disclosed herein, e.g., ketones, alcohols, hydrocarbons, etc., or any combination thereof.

Aspect 4. The process defined in aspect 3, wherein the chromium-containing compound is soluble in the organic solvent.

Aspect 5. The process defined in any one of aspects 1-3, wherein the chromium-containing compound is soluble in water.

Aspect 6. The process defined in any one of aspects 1-3, wherein the chromium-containing compound comprises any suitable chromium (II) compound or any chromium (II) compound disclosed herein, e.g., chromium (II) acetate, chromium (II) chloride, chromium (II) bromide, chromium (II) iodide, chromium (II) sulfate, etc., or any combination thereof.

Aspect 7. The process defined in any one of aspects 1-3, wherein the chromium-containing compound comprises any suitable chromium (III) compound or any chromium (III) compound disclosed herein, e.g., a chromium (III) carboxylate, a chromium (III) napthenate, a chromium (III) halide, chromium (III) sulfate, chromium (III) nitrate, a chromium (III) dionate, etc., or any combination thereof.

Aspect 8. The process defined in any one of aspects 1-3, wherein the chromium-containing compound comprises any suitable chromium (III) compound or any chromium (III) compound disclosed herein, e.g., chromium (III) acetate, chromium (III) acetylacetonate, chromium (III) chloride, chromium (III) bromide, chromium (III) sulfate, chromium (III) nitrate, etc., or any combination thereof.

Aspect 9. The process defined in any one of aspects 1-3, wherein the chromium-containing compound comprises any suitable chromium-containing compound or any chromium-containing compound disclosed herein, e.g., tertiary butyl chromate, chromium trioxide, ammonium chromate, ammonium dichromate, a diarene chromium (0) compound, bis-cyclopentadienyl chromium (II), chromium (III) acetylacetonate, chromium acetate, etc., or any combination thereof.

Aspect 10. The process defined in any one of aspects 1-3, wherein the chromium-containing compound comprises any suitable chromium-containing compound or any chromium-containing compound disclosed herein, e.g., chromium trioxide, chromium acetate, chromium nitrate, etc., or any combination thereof.

Aspect 11. The process defined in any one of the preceding aspects, wherein drying comprises spray drying.

Aspect 12. A process for preparing a supported chromium catalyst, the process comprising contacting a support comprising a silica-coated alumina with a chromium-containing compound while calcining at a peak temperature of at least about 650° C., optionally in an oxidizing atmosphere, to form the supported chromium catalyst, wherein the silica-coated alumina contains at least about 30 wt. % silica.

Aspect 13. The process defined in aspect 12, wherein the chromium-containing compound comprises any suitable chromium-containing compound or any chromium-containing compound disclosed herein, e.g., chromium (III) acetate, basic chromium (III) acetate, chromium (III) acetylacetonate, $Cr_2(SO_4)_3$, $Cr(NO_3)_3$, $CrO_3$, etc., or any combination thereof.

Aspect 14. The process defined in any one of the preceding aspects, wherein the supported chromium catalyst comprises any suitable amount of chromium or any amount disclosed herein, e.g., from about 0.1 to about 15 wt. %, from about 0.2 to about 10 wt. %, from about 0.5 to about 5 wt. %, from about 0.5 to about 2.5 wt. %, etc., based on the weight of the catalyst.

Aspect 15. The process defined in aspect 14, wherein at least about 50 wt. %, at least about 65 wt. %, at least about 75 wt. %, at least about 85 wt. %, etc., of the chromium is present in an oxidation state of +6 (VI).

Aspect 16. The process defined in any one of the preceding aspects, wherein the peak temperature is any suitable temperature or a temperature in any range disclosed herein, e.g., at least about 700° C., from about 650° C. to about 900° C., from about 650° C. to about 871° C., from about 650° C. to about 800° C., from about 700° C. to about 900° C., from about 700° C. to about 871° C., from about 700° C. to about 850° C., from about 725° C. to about 900° C., from about 750° C. to about 871° C., from about 750° C. to about 850° C., etc.

Aspect 17. The process defined in any one of the preceding aspects, wherein the calcining is performed for any suitable calcining time or any time period disclosed herein, e.g., from about 15 min to about 24 hours, from about 30 min to about 12 hours, from about 1 to about 10 hours, from about 2 to about 8 hours, etc.

Aspect 18. The process defined in any one of the preceding aspects, wherein the oxidizing atmosphere comprises any suitable oxidizing atmosphere or any oxidizing atmosphere disclosed herein, e.g., air, a mixture of oxygen and an inert gas, a mixture of oxygen and nitrogen, etc.

Aspect 19. The process defined in any one of the preceding aspects, wherein the catalyst has any suitable pore volume (total) or a pore volume (total) in any range disclosed herein, e.g., from about 0.5 to about 5 mL/g, from about 0.5 to about 2 mL/g, from about 1 to about 5 mL/g, from about 0.6 to about 3 mL/g, from about 0.8 to about 1.6 mL/g, from about 1 to about 2 mL/g, from about 1 to about 1.5 mL/g, etc.

Aspect 20. The process defined in any one of the preceding aspects, wherein the catalyst has any suitable BET surface area or a BET surface area in any range disclosed herein, e.g., from about 200 to about 700 m$^2$/g, from about 250 to about 550 m$^2$/g, from about 275 to about 525 m$^2$/g, from about 275 to about 550 m$^2$/g, from about 300 to about 525 m$^2$/g, from about 320 to about 510 m$^2$/g, etc.

Aspect 21. The process defined in any one of the preceding aspects, wherein the catalyst has any suitable average (d50) particle size or an average (d50) particle size in any range disclosed herein, e.g., from about 10 to about 500 microns, from about 25 to about 250 microns, from about 30 to about 100 microns, etc.

Aspect 22. The process defined in any one of the preceding aspects, wherein the supported chromium catalyst comprises chromium/silica-coated alumina.

Aspect 23. The process defined in any one of aspects 1-22, wherein the supported chromium catalyst is chromium/silica-coated alumina (e.g., the catalyst contains less than 0.5 wt. % F, less than 0.1 wt. % F, etc.).

Aspect 24. The process defined in any one of aspects 1-22, wherein the supported chromium catalyst comprises chromium/sulfated silica-coated alumina.

Aspect 25. The process defined in any one of aspects 1-22, wherein the supported chromium catalyst comprises chromium/phosphated silica-coated alumina.

Aspect 26. The process defined in any one of aspects 1-22, wherein the supported chromium catalyst comprises chromium/titanated silica-coated alumina.

Aspect 27. The process defined in any one of aspects 1-22, wherein the supported chromium catalyst comprises chromium/sulfided silica-coated alumina.

Aspect 28. The process defined in any one of the preceding aspects, wherein the silica-coated alumina contains any suitable amount of silica or any amount of silica in any range disclosed herein, e.g., from about 30 to about 95 wt. % silica, from about 35 to about 95 wt. % silica, from about 35 to about 75 wt. % silica, from about 35 to about 45 wt. % silica, from about 70 to about 95 wt. % silica, from about 40 to about 70 wt. % silica, etc., based on the weight of the silica-coated alumina.

Aspect 29. The process defined in any one of the preceding aspects, wherein a catalyst activity of the supported chromium catalyst is in any range disclosed herein, e.g., greater than about 3000 grams, greater than about 4000 grams, greater than about 5000 grams, greater than about 7000 grams, greater than about 9000 grams, etc. (and up to about 10,000, up to about 12,000, or up to about 14,000 grams), of polyethylene per gram of the supported chromium catalyst per hour, under slurry polymerization conditions, with no co-catalyst, using isobutane as a diluent, and with a polymerization temperature of 105° C. and a reactor pressure of 550 psig.

Aspect 30. A supported chromium catalyst produced by the process defined in any one of the preceding aspects.

Aspect 31. A chromium/silica-coated alumina catalyst comprising:
from about 0.01 to about 20 wt. % chromium, based on the weight of the catalyst; and a silica-coated alumina containing at least about 30 wt. % silica, based on the weight of the silica-coated alumina; wherein the catalyst has:
a pore volume from about 0.5 to about 2 mL/g; and
a BET surface area from about 275 to about 550 $m^2/g$.

Aspect 32. The catalyst defined in aspect 31, wherein the catalyst comprises any suitable amount of chromium or any amount disclosed herein, e.g., from about 0.1 to about 15 wt. %, from about 0.2 to about 10 wt. %, from about 0.5 to about 5 wt. %, from about 0.5 to about 2.5 wt. %, etc., based on the weight of the catalyst.

Aspect 33. The catalyst defined in aspects 31 or 32, wherein the silica-coated alumina contains any suitable amount of silica or any amount of silica in any range disclosed herein, e.g., from about 30 to about 95 wt. % silica, from about 35 to about 95 wt. % silica, from about 35 to about 75 wt. % silica, from about 35 to about 45 wt. % silica, from about 70 to about 95 wt. % silica, from about 40 to about 70 wt. % silica, etc., based on the weight of the silica-coated alumina.

Aspect 34. The catalyst defined in any one of aspects 31-33, wherein the catalyst has any suitable pore volume (total) or a pore volume (total) in any range disclosed herein, e.g., from about 0.5 to about 2 mL/g, from about 0.6 to about 1.8 mL/g, from about 0.8 to about 1.6 mL/g, from about 1 to about 2 mL/g, from about 1 to about 1.5 mL/g, etc.

Aspect 35. The catalyst defined in any one of aspects 31-34, wherein the catalyst has any suitable BET surface area or a BET surface area in any range disclosed herein, e.g., from about 275 to about 550 $m^2/g$, from about 275 to about 525 $m^2/g$, from about 300 to about 525 $m^2/g$, from about 320 to about 510 $m^2/g$, etc.

Aspect 36. The catalyst defined in any one of aspects 31-35, wherein the catalyst has any suitable average (d50) particle size or an average (d50) particle size in any range disclosed herein, e.g., from about 10 to about 500 microns, from about 25 to about 250 microns, from about 30 to about 100 microns, etc.

Aspect 37. The catalyst defined in any one of aspects 31-36, wherein at least about 50 wt. %, at least about 65 wt. %, at least about 75 wt. %, at least about 85 wt. %, etc., of the chromium is present in an oxidation state of +6 (VI).

Aspect 38. The catalyst defined in any one of aspects 31-37, wherein the catalyst contains less than 0.5 wt. % F, less than 0.1 wt. % F, etc.

Aspect 39. The catalyst defined in any one of aspects 31-38, wherein the catalyst comprises chromium/sulfated silica-coated alumina.

Aspect 40. The catalyst defined in any one of aspects 31-38, wherein the catalyst comprises chromium/phosphated silica-coated alumina.

Aspect 41. The catalyst defined in any one of aspects 31-38, wherein the catalyst comprises chromium/titanated silica-coated alumina.

Aspect 42. The catalyst defined in any one of aspects 31-38, wherein the catalyst comprises chromium/sulfided silica-coated alumina.

Aspect 43. The catalyst defined in any one of aspects 31-42, wherein a catalyst activity of the catalyst is in any range disclosed herein, e.g., greater than about 3000 grams, greater than about 4000 grams, greater than about 5000 grams, greater than about 7000 grams, greater than about 9000 grams, etc. (and up to about 10,000, up to about 12,000, or up to about 14,000 grams), of polyethylene per gram of the supported chromium catalyst per hour, under slurry polymerization conditions, with no co-catalyst, using isobutane as a diluent, and with a polymerization temperature of 105° C. and a reactor pressure of 550 psig.

Aspect 44. An olefin polymerization process, the process comprising:
the process defined in any one of aspects 1-29; and
contacting the supported chromium catalyst with an olefin monomer and an optional olefin comonomer in a polymerization reactor system under polymerization conditions to produce an olefin polymer.

Aspect 45. An olefin polymerization process, the process comprising contacting the catalyst defined in any one of aspects 30-43 with an olefin monomer and an optional olefin comonomer in a polymerization reactor system under polymerization conditions to produce an olefin polymer.

Aspect 46. The olefin polymerization process defined in aspect 44 or 45, wherein no co-catalyst is used.

Aspect 47. The olefin polymerization process defined in aspect 44 or 45, wherein substantially no co-catalyst is used, e.g., less than 5 ppm (by weight), less than 2 ppm, less than 1 ppm, less than 0.5 ppm, less than 0.3 ppm, etc., based on reactor contents or diluent in the reactor.

Aspect 48. The olefin polymerization process defined in any one of aspects 44-47, wherein the olefin monomer comprises any olefin monomer disclosed herein, e.g., any $C_2$-$C_{20}$ olefin.

Aspect 49. The olefin polymerization process defined in any one of aspects 44-48, wherein the olefin monomer and the optional olefin comonomer independently comprise a $C_2$-$C_{20}$ alpha-olefin.

Aspect 50. The olefin polymerization process defined in any one of aspects 44-49, wherein the olefin monomer comprises ethylene.

Aspect 51. The olefin polymerization process defined in any one of aspects 44-50, wherein the catalyst is contacted with ethylene and an olefin comonomer comprising a $C_3$-$C_{10}$ alpha-olefin.

Aspect 52. The olefin polymerization process defined in any one of aspects 44-51, wherein the catalyst is contacted with ethylene and an olefin comonomer comprising 1-butene, 1-hexene, 1-octene, or a mixture thereof.

Aspect 53. The olefin polymerization process defined in any one of aspects 44-49, wherein the olefin monomer comprises propylene.

Aspect 54. The olefin polymerization process defined in any one of aspects 44-53, wherein the polymerization reactor system comprises a batch reactor, a slurry reactor, a gas-phase reactor, a solution reactor, a high pressure reactor, a tubular reactor, an autoclave reactor, or a combination thereof.

Aspect 55. The olefin polymerization process defined in any one of aspects 44-54, wherein the polymerization reactor system comprises a slurry reactor, a gas-phase reactor, a solution reactor, or a combination thereof.

Aspect 56. The olefin polymerization process defined in any one of aspects 44-55, wherein the polymerization reactor system comprises a loop slurry reactor.

Aspect 57. The olefin polymerization process defined in any one of aspects 44-56, wherein the polymerization reactor system comprises a single reactor.

Aspect 58. The olefin polymerization process defined in any one of aspects 44-56, wherein the polymerization reactor system comprises 2 reactors.

Aspect 59. The olefin polymerization process defined in any one of aspects 44-56, wherein the polymerization reactor system comprises more than 2 reactors.

Aspect 60. The olefin polymerization process defined in any one of aspects 44-59, wherein the olefin polymer comprises any olefin polymer disclosed herein.

Aspect 61. The olefin polymerization process defined in any one of aspects 44-52 or 54-60, wherein the olefin polymer comprises an ethylene homopolymer, an ethylene/1-butene copolymer, an ethylene/1-hexene copolymer, and/or an ethylene/1-octene copolymer.

Aspect 62. The olefin polymerization process defined in any one of aspects 44-49 or 53-60, wherein the olefin polymer comprises a polypropylene homopolymer and/or a propylene-based copolymer.

Aspect 63. The olefin polymerization process defined in any one of aspects 44-62, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 64. The olefin polymerization process defined in any one of aspects 44-63, wherein the polymerization conditions are substantially constant, e.g., for a particular polymer grade.

Aspect 65. The olefin polymerization process defined in any one of aspects 44-64, wherein no hydrogen is added to the polymerization reactor system.

Aspect 66. The olefin polymerization process defined in any one of aspects 44-64, wherein hydrogen is added to the polymerization reactor system.

Aspect 67. The olefin polymerization process defined in any one of aspects 44-66, wherein the olefin polymer has a density in any range disclosed herein, e.g., from about 0.90 to about 0.97, from about 0.92 to about 0.96, from about 0.93 to about 0.955, from about 0.94 to about 0.955 g/cm$^3$, etc.

Aspect 68. The olefin polymerization process defined in any one of aspects 44-67, wherein the olefin polymer has a HLMI in any range disclosed herein, e.g., less than or equal to about 25, less than or equal to about 10, less than or equal to about 5, less than or equal to about 2 g/10 min, etc.

Aspect 69. The olefin polymerization process defined in any one of aspects 44-68, wherein the olefin polymer has a ratio of Mw/Mn in any range disclosed herein, e.g., from about 8 to about 50, from about 8 to about 25, from about 10 to about 25, etc.

Aspect 70. The olefin polymerization process defined in any one of aspects 44-69, wherein the olefin polymer has a ratio of Mz/Mw in any range disclosed herein, e.g., from about 4 to about 10, from about 5 to about 10, from about 5 to about 9, etc.

Aspect 71. The olefin polymerization process defined in any one of aspects 44-70, wherein the olefin polymer has a weight-average molecular weight (Mw) in any range disclosed herein, e.g., from about 200,000 to about 900,000 g/mol, from about 200,000 to about 700,000 g/mol, from about 300,000 to about 800,000 g/mol, etc.

Aspect 72. The olefin polymerization process defined in any one of aspects 44-71, wherein the olefin polymer has a relaxation time in any range disclosed herein, e.g., from about 3 to about 50, from about 5 to about 50, from about 5 to about 25 sec, etc.

Aspect 73. The olefin polymerization process defined in any one of aspects 44-72, wherein the olefin polymer has a CY-a parameter in any range disclosed herein, e.g., from about 0.05 to about 0.2, from about 0.05 to about 0.18, from about 0.08 to about 0.15, etc.

Aspect 74. An olefin polymer produced by the olefin polymerization process defined in any one of aspects 44-73.

Aspect 75. An article of manufacture comprising the polymer defined in aspect 74.

Aspect 76. The article defined in aspect 75, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. A chromium/silica-coated alumina catalyst comprising:
   from about 0.01 to about 20 wt. % chromium and less than 0.05 wt. % fluorine, based on the weight of the catalyst; and
   a silica-coated alumina containing at least about 30 wt. % silica, based on the weight of the silica-coated alumina;
   wherein the catalyst has:
   a pore volume from about 0.5 to about 2 mL/g; and
   a BET surface area from about 275 to about 550 m$^2$/g.

2. The catalyst of claim 1, wherein:
   the silica-coated alumina contains from about 35 to about 95 wt. % silica; and
   the catalyst contains from about 0.2 to about 10 wt. % chromium.

3. The catalyst of claim 1, wherein:
   the silica-coated alumina contains from about 35 to about 45 wt. % silica; or
   the silica-coated alumina contains from about 70 to about 95 wt. % silica.

4. The catalyst of claim 1, wherein:
   the pore volume is from about 1 to about 1.5 mL/g; and
   the BET surface area is from about 300 to about 525 m$^2$/g.

5. The catalyst of claim 1, wherein the catalyst contains: from about 0.5 to about 5 wt. % chromium.

6. The catalyst of claim 1, wherein a catalyst activity of the catalyst is greater than about 4000 grams of polyethylene per gram of the catalyst per hour, under slurry polymerization conditions, with no co-catalyst, using isobutane as a diluent, and with a polymerization temperature of 105° C. and a reactor pressure of 550 psig.

7. The catalyst of claim 2, wherein the catalyst has an average (d50) particle size in a range from about 25 to about 250 microns.

8. The catalyst of claim 2, wherein at least about 65 wt. % of the chromium is present in an oxidation state of +6 (VI).

9. The catalyst of claim 2, wherein a catalyst activity of the catalyst is greater than about 7000 grams of polyethylene per gram of the catalyst per hour, under slurry polymerization conditions, with no co-catalyst, using isobutane as a diluent, and with a polymerization temperature of 105° C. and a reactor pressure of 550 psig.

10. The catalyst of claim 2, wherein:
    the pore volume is from about 1 to about 1.5 mL/g; and
    the BET surface area is from about 300 to about 525 m²/g.

11. The catalyst of claim 5, wherein the silica-coated alumina contains from about 35 to about 45 wt. % silica.

12. The catalyst of claim 5, wherein the silica-coated alumina contains from about 70 to about 95 wt. % silica.

13. The catalyst of claim 5, wherein:
    the pore volume is from about 1 to about 1.5 mL/g; and
    the BET surface area is from about 300 to about 525 m²/g.

14. The catalyst of claim 13, wherein a catalyst activity of the catalyst is greater than about 5000 grams of polyethylene per gram of the catalyst per hour, under slurry polymerization conditions, with no co-catalyst, using isobutane as a diluent, and with a polymerization temperature of 105° C. and a reactor pressure of 550 psig.

15. The catalyst of claim 13, wherein at least about 65 wt. % of the chromium is present in an oxidation state of +6 (VI).

16. The catalyst of claim 1, wherein the catalyst has an average (d50) particle size in a range from about 25 to about 250 microns.

17. The catalyst of claim 1, wherein at least about 65 wt. % of the chromium is present in an oxidation state of +6 (VI).

18. The catalyst of claim 2, wherein:
    the catalyst has an average (d50) particle size in a range from about 30 to about 100 microns; and
    at least about 85 wt. % of the chromium is present in an oxidation state of +6 (VI).

19. The catalyst of claim 2, wherein the catalyst contains from about 0.5 to about 5 wt. % chromium.

20. The catalyst of claim 5, wherein the catalyst has an average (d50) particle size in a range from about 25 to about 250 microns.

21. The catalyst of claim 5, wherein at least about 65 wt. % of the chromium is present in an oxidation state of +6 (VI).

22. The catalyst of claim 13, wherein the silica-coated alumina contains from about 35 to about 45 wt. % silica.

\* \* \* \* \*